United States Patent Office 3,017,028
Patented Jan. 16, 1962

3,017,028
CLAY DEPRESSANT
Edmund A. Schoeld and Clarence W. Egbom, Carlsbad, N. Mex., assignors to Potash Company of America, Carlsbad, N. Mex., a corporation of Colorado
No Drawing. Filed Jan. 12, 1959, Ser. No. 786,033
9 Claims. (Cl. 209—167)

This invention relates to a beneficiation treatment for the concentration of the valuable constituents from a natural ore, and more particularly to the treatment of clay and other slimes occurring in the natural ore to enable a flotation concentration to be made economically.

Flotation separations of minerals from their natural ores have been known and been used commercially for years. Such flotation treatments have been commercially used for insoluble and soluble mineral constituents alike. In the flotation beneficiation processes of soluble ore, for example potassium bearing ores, two distinct systems are utilized commercially. In one system the potassium component (sylvite and the like) may be floated from the other constituents using certain flotation reagents. In the other process, the undesired constituents, for example sodium chloride (halite), clay and other gangue materials, may be floated leaving the potassium component as the underflow product. In the phosphate industry, similar systems are used to recover the phosphorous components.

In the one segment of the potash industry, particles of the potassium constituent (generally sylvite) are coated with an aliphatic primary amine. This permits air bubble attachment, through aeration, to the coated particles and thus floats the potassium component from the residue of ores. In such a process, clay and fine slime materials in the ore tend to absorb the reagent, increasing reagent consumption and making the process uneconomical. One solution is complete desliming of the ground ore prior to a flotation process. Such a complete clay removal or desliming is not commercially practical, however, due to the high cost. Certain materials have been found to render the clay and slime materials inactive, and in general these reagents are less expensive than the amine reagents. Reagents for rendering the clays inactive include among others starch, guar, magnesium hydroxide, polyglycols, and other similar types of materials well known in the art. Commercially, therefore, clay inactivation or depressing has been established as a necessary step in a flotation treatment of potash ores using an aliphatic amine flotation reagent.

We have now found that certain water soluble, intermediate condensation products of certain amino compounds of the carbamide type and lower molecular weight aldehydes are economical and effective depressants. These materials contain amino groups which are vigorously held to the clay and slime, and are highly effective in preventing the absorption of aliphatic primary amine reagent by the clay. The size of molecule of these depressants is such that they do not readily diffuse through the pulp, but once attracted to the clay, they are not displaced by aliphatic amine reagents which are subsequently added to the pulp.

Briefly stated, the invention comprises the use of a colloidal, water dispersable intermediate stage amino resin of relatively high molecular weight consisting, preferably, of linear polymers containing amino groups. The molecular weight of the composition is sufficiently high to prevent ready diffusion in a pulp. The amino groups of the compositions have a great affinity for the clay. These compositions are liquid and are water soluble.

In producing compositions according to the invention, the condensation of the carbamide type compound and aldehyde compositions must be controlled within rather close limits. A mixture of the two ingredients alone, without reaction, is ineffective for clay depressing and of no value in flotation. On the other hand, if the condensation reaction is permitted to continue to completion, a highly insoluble material is formed, usually hard, thermo-setting resins, which cannot be dispersed in an aqueous pulp and, therefore, are ineffective in flotation. The condensation reaction is carried to a point where the solution of the ingredients becomes viscous but still retains appreciable water solubility. The clay depressing effectiveness of the resultant intermediate condensation product increases as the molecular weight of the material increases. However, the solubility of these compositions is the limiting factor and as high molecular weight compositions tend to be insoluble their effectiveness in flotation is limited. The most effective products may be the linear type polymers, since those methods which are claimed to produce linear polymers generally produce effective materials. Extensive cross-linking of linear chains, such as produced by the complete condensation, produces insoluble materials which are ineffective as clay depressants.

The processes for producing the intermediate condensation products of the carbamide compounds and aldehydes are generally dependent on such factors as concentration, pH, presence of and concentration of catalysts, temperature, time and like variables. Thus many methods of preparation of the intermediate condensation products may be utilized so long as the methods produce a product of the characteristics described above. In one preferred form, urea and formaldehyde react to produce an intermediate condensation product which is a viscous water soluble liquid. Urea is an inexpensive, relatively abundant reagent and is thus economically suited for the process. Other compounds similar to urea in structure and properties are, also, useful in the process such as melamine, thiourea, guanidine, substituted ureas such as mono and dimethylolurea, and the like may be effectively used as a substitute for the urea or mixed with it. These carbamides may all be used individually or mixed with others to produce an effective composition. Lower molecular weight aldehydes, such as formaldehyde, and acetaldehyde, may be used for reacting with the carbamide compounds, and the aldehydes may be used individually or mixed together to produce useful intermediate condensation products. With increasing molecular weight of the reactants, however, insoluble polymers are produced faster with essentially the same extent of condensation reaction. Thus it is readily seen that the water solubility of the products of the reactants determines the practical limits of the size of the amine and the aldehyde molecules.

The clay depressants of the invention are, generally, produced by reacting a carbamide and aldehyde at suitable temperatures and in the presence of catalysts until a viscous solution is obtained. The resultant solution is diluted with water or brine, to produce the desired solution concentration which will be added to the pulp. This diluted solution is then added to the pulp, or the deslimed pulp, in the desired quantity. The pulp is then thoroughly mixed or conditioned prior to the addition of a flotation reagent, and other reagents where desired.

An excellent intermediate condensation product for use as a clay depressant is prepared as follows: 3 moles of a 37.3% formaldehyde solution (the formaldehyde solution containing about 12.5% methanol as a stabilizer) is reacted with 1 mole of urea in the presence of 0.1 mole of 28% aqueous ammonia, 0.001 mole of 10% sodium hydroxide solution and 0.01 mole of 30% acetic acid at a boiling temperature (reflux) for about one hour. At the end of about one hour the solution has a viscosity of about 20 centipoises at room temperature. The condensation is arrested by neutralization with sodium hydroxide and the resulting clear, viscous syrup is cooled. The resultant solution, in this neutralized form, is quite stable for substantial periods of time. For flotation this solution of the condensation product is diluted with water or brine to about 0.5% by weight of solids for convenience in distribution.

In preparing the condensation product using urea and formaldehyde, a mole ratio of 3 to 1, formaldehyde to urea, is a preferred form. When three moles of formaldehyde are used, the resulting resin remains soluble on dilution with water.

In catalyzing the condensation, acetic acid is a preferred agent since it results in a product which is buffered at about pH 4.0–4.5. If the resin solutions are permitted to stand at this pH, an increase in viscosity results, and after a period of several days it forms a soft gel. Such gels exhibit excellent clay depressing properties, however, for ease of handling it is preferred to stop the reaction so as to maintain a sol state.

Another satisfactory resin for use as a clay depressant in a flotation treatment is prepared as follows: 2.9 moles of formaldehyde, as a 37.3% formaldehyde solution, is reacted with 1 mole of urea in the presence of 0.3 mole of ammonia, and 0.001 mole of 10% sodium hydroxide solution under reflux conditions for a period of about two hours. The resultant mixture is then cooled to about 50° C. and acetic acid is added to reduce the pH to 4. The reaction is then continued for 24 hours, after which time the mixture is cooled. The resultant solution is a clear, viscous syrup of improved stability in the acid condition.

The quantity of clay depressant required in any flotation process and the extent of desliming is, of course, governed by the amount and nature of the clay and slime components in the ore itself. For economy a minimum amount of clay depressant is preferred, and the examples herein are described with extensive desliming and minimum quantities of clay depressant. No advantage in the flotation is noted by increasing the amount of the clay depressant additive over the minimum amount necessary to inactivate the clay present at the flotation stage. Furthermore, the details of and the reagents needed during the flotation treatment may be varied to suit the particular ore being treated. In some ores, the clay is more difficult to separate from the crystal surfaces than in other types of ores. For example, a scrubbing time of fifteen seconds may be adequate for some ores whereas others may require up to four minutes or more under the scrubbing conditions of the test. Variation in additional conditions and details of the flotation will be readily understood by those skilled in the art and as is well known, these are determined under operating conditions.

Example 1

A sample of potash ore crushed to a minus 14 mesh, containing from about 15 to 20% plus 20 mesh size (Tyler standard sieve sizes are used throughout this specification) was pulped at a ratio of 225 grams to 175 ml. of brine (saturated with respect to sylvite and halite) forming a pulp of about 50% solids. This pulp was mixed in a small vessel equipped with a four-bladed turbine agitator of about 1¼ inches diameter and turning at about 1150 revolutions per minute for a period of about four minutes. This agitation scrubs the ore essentially releasing the clay slimes from the ore surfaces.

To the scrubbed pulp is added 175 ml. of brine with mixing. After settling for about a minute, about 230 ml. of supernatant brine and fine solids are decanted from the settled solids. In five succeeding stages of 175 ml. each, brine is added to the pulp, mixed and the same amount decanted. This produces a deslimed ore feed containing about 55% solids.

A urea formaldehyde resin clay depressant, condensation product (as described above) in a dilute solution is added to the deslimed ore with mixing at about 1150 r.p.m. The mixing is continued for about one minute and the residual clay in the pulp is inactivated or depressed.

An aliphatic amine flotation reagent is added to the deslimed and conditioned ore, and the mixture is agitated for one minute. Such "amine" flotation reagents are well known in the art, and include saturated and unsaturated straight chain aliphatic amines and their water soluble salts. A frother is then added, Dowfroth 250 (for example) is used in these flotation tests. The mixture of the reagents and the ore was admixed or conditioned at a low velocity during the addition of the frother. The resultant pulp was then transferred to a flotation cell and diluted with brine to about 30% solids. Air for the flotation treatment was introduced into the flotation cell through a diffusion tube adjacent the bottom under an impeller. The impeller used is a six-bladed agitator impeller having the blades pitched at about a 45° angle and the agitator is about 1¾ inches in diameter. During the flotation tests the impeller is rotated at about 800 r.p.m. and the flotation continued for about five minutes. Air is introduced into the cell at a rate of about 1 cubic foot per hour.

In the above and following tests, since amine is the collector reagent, the floated product contains the potash values collected as the concentrate, and the depressed material is discarded as the tailings.

| Examples | 2 | 3 | 4 | 5 | 6 | 7 | 8 | 9 |
|---|---|---|---|---|---|---|---|---|
| Ore Distribution, Grams: | | | | | | | | |
| Slimes | 22.7 | 21.9 | 21.9 | 22.6 | 19.5 | 19.4 | 21.7 | 21.5 |
| Conc | 97.0 | 95.9 | 79.7 | 44.0 | 96.8 | 96.6 | 79.2 | 57.7 |
| Tails | 102.8 | 107.1 | 121.8 | 152.4 | 105.2 | 103.8 | 123.2 | 138.8 |
| Analysis, percent $K_2O$: | | | | | | | | |
| Slimes | 27.76 | 24.65 | 24.65 | 27.07 | 24.53 | 24.25 | 28.28 | 23.83 |
| Conc | 58.14 | 58.00 | 58.80 | 58.24 | 59.80 | 59.48 | 59.80 | 60.42 |
| Tails | 2.06 | 3.33 | 9.48 | 20.69 | 1.22 | 1.33 | 8.73 | 16.37 |
| Recovery of $K_2O$ | | | | | | | | |
| Slimes | 9.6 | 8.3 | 8.2 | 9.4 | 7.6 | 7.4 | 9.4 | 8.3 |
| Conc | 86.9 | 86.1 | 72.2 | 40.1 | 90.3 | 90.5 | 73.8 | 55.6 |
| Tails | 3.5 | 5.6 | 19.6 | 50.5 | 2.1 | 2.1 | 16.8 | 36.1 |
| Reagents: | | | | | | | | |
| Auxiliary | resin | resin | resin | none | resin | resin | resin | none |
| lbs per ton— | | | | | | | | |
| of resin | .20 | .10 | .05 | | .20 | .10 | .05 | |
| of amine | .05 | .05 | .05 | .05 | .20 | .20 | .20 | .20 |
| Flotation Recovery Conc | 96.2 | 93.8 | 78.7 | 44.3 | 97.7 | 97.6 | 81.5 | 60.6 |

It is evident from the above tests that when using the minimum rate of amine, that is 0.05 pound per ton of ore, the flotation results were excellent when the two highest rates of the auxiliary reagent were used. It is noted that the effective concentration decreases as the amount of auxiliary reagent is reduced and approaches a minimum where no auxiliary reagent is used. Similarly at the higher rate of amine, as shown in Examples 6–9 where 0.20 pound per ton of ore are used, the effective concentration decreased to the point where no auxiliary reagent is added. With the particular deslimed ore, the greatest use rate of auxiliary reagent was very effective with both quantities of the amine.

When the amount of amine added to the test was increased from 0.05 to 0.20 pound per ton, it was still necessary to add the resin to secure optimum flotation results. Further, since the ore in these tests was quite effectively deslimed, the reagent rates are exceptionally low.

The following comparative tests illustrate results using guar, an auxiliary reagent according to the invention, and no auxiliary reagent.

| Test No. | A | B | C | D | E | F |
|---|---|---|---|---|---|---|
| Ore Lot | 1 | 1 | 1 | 3 | 3 | 3 |
| Reagents: | | | | | | |
| Auxiliary | guar | none | resin | resin | guar | resin |
| Rates in lbs/ton— | | | | | | |
| Auxiliary | .2 | ---- | .25 | .2 | .2 | .2 |
| Amine | .1 | .1 | .1 | .2 | .2 | .2 |
| Grams floated | 82.0 | 39.6 | 82.0 | 76.0 | 88.3 | 92.2 |
| Percent $K_2O$ in tails | 3.58 | ---- | 4.25 | ---- | 1.96 | 1.19 |

The Example D utilizes a resin prepared from melamine substituted for the urea in the formation of the auxiliary reagent. This reagent was prepared in essentially the same manner as the preparation of the urea formaldehyde reagent set forth above, producing a viscous water soluble liquid which is diluted and subsequently added to the pulp as set forth above.

In addition to the tests given above, other tests were conducted without the desliming, that is, in the presence of the total amount of the clay in the ore. In these tests no flotation at all was secured without an auxiliary reagent. By the use of about 1.0 pound of resin per ton of ore and about 0.3 pound of amine per ton of ore flotation was secured which recovered about 83% of the total potash in the ore. While such a flotation is not practical on a commercial basis, it is indicative of the beneficial results achieved by the auxiliary reagent.

We claim:

1. The improvement in the method of separating valuable constituents from potassium bearing ores including subjecting such an ore to a concentrating process employing a mineral collector, said improvement residing in distributing in said ore during the concentrating process a useful amount of an auxiliary reagent which is a water soluble, intermediate stage condensation resin of a carbamide compound and a lower molecular weight aldehyde.

2. The improvement in the method of separating potassium values from potassium bearing ores including subjecting such an ore to a concentrating process employing an aliphatic amine mineral collector, said improvement residing in distributing in said ore during the concentrating process a useful amount of an auxiliary reagent which is an aqueous solution of a water soluble, condensation product of a carbamide compound and a lower molecular weight aldehyde.

3. The improvement in the method of concentrating sylvite from sylvinite ore in a pulp formed by suspending particles of such sylvinite ore in a brine solution of the ore constituents and subjecting the resultant pulp to a flotation concentration with an aliphatic amine as the sylvite collector reagent, said improvement residing in distributing in said pulp a useful amount of an auxiliary reagent which is an aqueous solution of a water soluble, intermediate condensation resin of a carbamide compound and lower molecular weight aldehyde.

4. The improvement in the method of concentrating sylvite from sylvinite ore in a pulp formed by suspending particles of such sylvinite ore in a brine solution of the ore constituents and subjecting the resultant pulp to a flotation concentration with an aliphatic amine as the sylvite collector reagent, said improvement residing in distributing in said pulp a useful amount of an auxiliary reagent which is an aqueous solution of a water soluble intermediate condensation product of urea and formaldehyde.

5. The improvement in the method of concentrating sylvite from sylvinite ore in a pulp formed by suspending particles of such sylvinite ore in a brine solution of the ore constituents and subjecting the resultant pulp to a flotation concentration with an aliphatic amine as the sylvite collector reagent, said improvement residing in distributing in said pulp a useful amount of an auxiliary reagent which is an aqueous solution of a water soluble intermediate condensation product of melamine and formaldehyde.

6. The improvement in the method of concentrating sylvite from sylvinite ore in a pulp formed by suspending particles of such sylvinite ore in a brine solution of the ore constituents and subjecting the resultant pulp to a flotation concentration with an aliphatic amine as the sylvite collector reagent, said improvement residing in distributing in said pulp a useful amount of an auxiliary reagent which is an aqueous solution of a water soluble intermediate condensation product of guanidine and formaldehyde.

7. The improvement in the method of separating valuable constituents from potassium ores by flotation processes including subjecting a pulp of such ore to a flotation step using an aliphatic amine as a collector reagent, said improvement residing in distributing in the ore an aqueous solution of a useful amount of an intermediate condensation product of urea and formaldehyde, said product being characterized by being water soluble.

8. The improvement in the method of separating valuable constituents from potassium ores by flotation processes including subjecting a pulp of such ore to a flotation step using an aliphatic amine as a collector reagent, said improvement residing in distributing in the ore an aqueous solution of a useful amount of an intermediate condensation product of melamine and formaldehyde, said product being characterized by being water soluble.

9. The improvement in the method of separating valuable constituents from potassium ores by flotation processes including subjecting a pulp of such ore to a flotation step using an aliphatic amine as a collector reagent, said improvement residing in distributing in the ore an aqueous solution of a useful amount of an intermediate condensation product of guanidine and formaldehyde, said product being characterized by being water soluble.

References Cited in the file of this patent

UNITED STATES PATENTS 2,740,522    Aimone et al.  ----------- Apr. 3, 1956

FOREIGN PATENTS 154,799    Australia  -------------- Jan. 14, 1954